United States Patent [19]

McMullen et al.

[11] 3,940,254

[45] Feb. 24, 1976

[54] NICKEL CLAD STEEL COINAGE BLANK

[75] Inventors: Arthur G. McMullen, Edmonton; Michael J. H. Ruscoe, St. Albert; Maurice A. Clegg; Ronald L. Prowse, both of Fort Saskatchewan, all of Canada

[73] Assignee: Sherritt Gordon Mines Limited, Toronto, Canada

[22] Filed: Oct. 21, 1974

[21] Appl. No.: 516,248

[30] Foreign Application Priority Data

Sept. 16, 1974  Canada .................................. 209325

[52] U.S. Cl. ................ 29/196.6; 148/31.5; 148/34; 204/37 R
[51] Int. Cl.² ........................................ B32B 15/18
[58] Field of Search .................. 204/37 R; 29/196.6; 148/34, 31.5

[56] References Cited

UNITED STATES PATENTS

| | | | |
|---|---|---|---|
| 3,295,936 | 1/1967 | Asano et al. | 29/196.6 X |
| 3,398,448 | 8/1968 | Goodrich et al. | 29/196.6 X |
| 3,634,890 | 1/1972 | Conradt et al. | 29/199 |
| 3,645,861 | 2/1972 | Garvey | 29/196.6 X |
| 3,837,894 | 9/1974 | Tucker | 148/31.5 X |

*Primary Examiner*—L. Dewayne Rutledge
*Assistant Examiner*—Arthur J. Steiner
*Attorney, Agent, or Firm*—Frank I. Piper; Arne I. Fors

[57] ABSTRACT

A two-component blank suitable for minting into a coin is described. The blank consists of a low-carbon steel core completely encased in nickel. The blank has magnetic properties sufficiently similar to a solid nickel coin of the same size that the minted blank is accepted by magnetic property testing coin discriminating devices which accept pure nickel coins.

3 Claims, No Drawings

NICKEL CLAD STEEL COINAGE BLANK

This invention relates to a two-component blank suitable for minting into a coin, medallion or a like-shaped article and to a method of production of the blank. More particularly, the invention relates to a blank having a low carbon steel core completely encased in a nickel cladding. The properties of the blank after minting are sufficiently similar to those of a solid nickel coin that the minted blank is treated as such by many coin-discriminating devices capable of distinguishing between a genuine nickel coin and a counterfeit coin or a slug. The blank is produced according to the invention by a process which includes both electroplating and annealing steps.

Metallic nickel, owing to its tarnish-resistance, durability and attractive appearance, is used in many countries for coinage material. Recently, however, owing to the rapidly escalating value of metallic nickel, the intrinsic value of some nickel coinage has approached, and in some cases surpassed, its face value. Nickel coins have, as a result, largely disappeared from circulation in some countries despite laws which prohibit the melting down or export of such coins.

Efforts have been made to alloy or otherwise dilute nickel with cheaper elements in an attempt to produce coins which have the desirable qualities of pure nickel coins but which have a lower intrinsic value. While many alloys have been investigated, usually the resulting coins have properties which are less desirable than those of coins composed of pure nickel. For example, coins composed of nickel-copper or nickel-zinc alloys, when freshly minted, appear very similar to pure nickel coins but tend to become tarnished and dull in use. Also, nickel-alloy coins generally have properties sufficiently different from those of pure nickel coins that mechanical or electrical devices, which discriminate between genuine nickel coins and counterfeit coins or slugs, reject them, thus preventing the use of the alloy coins contemporaneously with nickel coins of the same size and face value.

Coin-discriminating devices in widespread use in coin-operated vending machines subject a coin to a number of tests on the basis of its size, weight, modulus of elasticity and magnetic properties.

Discrimination on the basis of magnetic properties is commonly made by causing the coin or slug to roll down an inclined ramp and through the magnetic field of a permanent magnet which is positioned under and adjacent to the lower end of the ramp. In Canada and other countries which use nickel coinage, the discriminator is adjusted such that the trajectory of a non-magnetic coin or slug which rolls off the end of the ramp is not influenced by the magnet and the coin or slug will fall into a "reject" compartment. If, on the other hand, the coin or slug is strongly magnetic, its trajectory will be greatly influenced by the magnet and it will likewise fall into the reject compartment. However, the trajectory of a pure nickel coin, while it is somewhat influenced by the magnet, is much less so than a coin or slug composed of iron or other strongly magnetic material so the nickel coin will fall into the "accept" compartment. Another type of magnetic test makes use of the force of attraction between the coin and a small magnet positioned adjacent to the face of the inserted coin. If the force of attraction between the magnet and the coin is large, in one type of magnetic testing device the coin is prevented from rolling down an incline or is diverted sideways, and is thereby rejected or accepted, respectively. However, if the coin is non-magnetic or the attractive force is not sufficient to hold the coin, as in the case of a nickel coin, it will proceed down the incline to the next test as, for example, determination of electrical conductivity or modulus of elasticity.

It is highly desirable that coins intended as substitutes for pure nickel coins have properties similar to those of pure nickel coins. Such substitute coins should desirably have appearance, wear and tarnish resistance similar to nickel but also should have similar magnetic properties so that they are accepted by coin-discriminating devices using magnetic tests. Where they have such properties, their introduction into circulation will cause little inconvenience to manufacturers and users of coin-operated vending machines which are adapted to accept pure nickel coinage.

It is an object of this invention to provide a blank which is significantly lower in cost than a blank of the same size and shape composed of pure nickel but which has an appearance, wear resistance and corrosion resistance similar to a pure nickel blank and which may be imprinted with deep and clear impressions without excessive die wear. Also, the blank so imprinted has magnetic properties sufficiently similar to a pure nickel coin of the same size and shape that it is accepted by most coin-discriminating devices that accept pure nickel coins.

A further object is to provide a process by which such a blank may be produced.

Broadly, the blank which forms the subject matter of the subject invention comprises a core formed of low carbon steel having a carbon content below about 0.03 wt %, a continuous cladding of nickel completely encasing said core, said cladding being of a thickness of at least 0.05 mm on the opposed faces of the blank and of 2 to 4 times greater radial thickness at the edge thereof, a layer of interdiffused nickel and iron metallurgically bonding said cladding to said substrate, said blank having a hardness value of less than 65 on the Rockwell 30T hardness scale and said blank having an induced magnetism value B in a field of 150 oersteds of less than about 4000 gauss measured on an axis through the centre of and normal to the faces of the blank whereby said blank, after minting, will be accepted by substantially all magnetic property testing coin discriminating devices which accept pure nickel coins.

The process of the invention broadly involves the steps of providing a core piece having opposed, substantially planar faces and a common side edge, said piece being composed of a low carbon steel containing less than about 0.03% by weight carbon; electrolytically plating said core piece with a continuous cladding of nickel of not less than 0.05 mm in thickness at the faces of said piece and of 2 to 4 times greater radial thickness at the side edge of said piece and heating said nickel cladded core piece to anneal the substrate to decrease the hardness thereof to less than 65, preferably less than 45, on the Rockwell 30T hardness scale and to form a layer of interdiffused nickel and iron which metallurgically bonds said cladding of nickel to said substrate.

The starting material for the blank of the invention is low carbon steel. The steel must contain less than about 0.03% by weight carbon. A higher carbon content is not desirable because it makes the material too hard for satisfactory minting. Preferably, for ease of minting, the carbon content is 0.01% or less. In addition to carbon, the starting material may contain other alloying elements commonly found in minor amounts in low carbon steel. The starting material may, for example, contain small quantities of silicon, manganese and nickel. Provided the starting material initially is of a hardness less than 65 Rockwell 30T, preferably less than 45, or is capable of annealing to such hardness, the material is satisfactory for purposes of the present invention.

The low carbon steel is formed to the desired thickness by rolling, for example, and is processed through a blanking and, if desired, edge forming operations which produce pieces of a size such that when the pieces are encased in the required amount of nickel, they will be the required size of the finished blank. In most cases, the blank will be circular in shape although the invention contemplates using other shapes such as squares, heptagons, etc. as well.

The substrate pieces are preferably given raised or upset rims in order to provide a rim thickness greater than that of any other portion of the finished blank, not only to facilitate stacking, but also to provide better wear protection to the central portion of the finished coin. The upset pieces are then treated in an electroplating step where a continuous layer or cladding of nickel is applied to the faces of the pieces as well as to their edges.

Electroplating of nickel onto the pieces may conveniently be carried out in a barrel plating apparatus. One such type of apparatus consists of a cylindrical barrel rotatable about a horizontal axis within a tank filled with plating solution. Flexible cathode rods are mounted internally of the barrel and baskets containing anode pieces are fixed in the tank externally of the barrel. The cathode rods and anode baskets are connected to the negative and positive terminals respectively of a D.C. source. The potential difference between the anode and cathode is desirably maintained in the range of 5–20 volts.

The substrate pieces are contacted by the cathode rods as they are tumbled within the rotating barrel. The plating solution is a standard nickel-plating electrolyte such as nickel sulphamate or Watt's solution. The amount of nickel plated onto the substrate pieces can be varied as required by changing the current density or the plating time. For economic reasons, it is preferable to plate onto the substrate the minimum amount of nickel that will provide satisfactory wear and corrosion-resistance as well as the desired magnetic properties. In general, for these purposes, the nickel layer on the face of the blank should be at least about 0.05 mm in thickness. A thicker layer of nickel may, however, be necessary in some cases, to ensure that the finished blanks meet commercial specifications and have the required magnetic property. The latter requirement is discussed in detail below.

The nickel layer plated onto the core piece is of greater thickness at the edge than at the centre of either face of the blank. In this context, the thickness of plating at the edge means thickness as measured radially outwardly at the midpoint of the core piece edge and the thickness of plating on the faces means thickness as measured axially outwardly at the centre of the face of the blank. The ratio of the thickness of nickel plated on the edge of the substrate pieces to the thickness of nickel plated onto the faces of the pieces is governed primarily by the dimensions of the barrel and the size of the pieces. Usually, the ratio is in the range of 2:1 to 4:1. That is, the thickness of plating on the edge (measured radially) is two to four times the thickness of the plating on either face of the blank. In general, it is found that the edge/face thickness ratio is decreased as the plating barrel diameter is increased and as the diameter of the piece is decreased. Since the thickness of the nickel on the core piece faces is less than on the edges, the thickness of nickel on the faces only need be determined following barrel plating to ensure that the minimum required layer or plating of 0.05 mm has been deposited.

Following the electroplating step, the nickel-clad substrate pieces are annealed to decrease the hardness of the blank to less than 65, and preferably less than 45, on the Rockwell 30T hardness scale and, at the same time, to cause atomic interdiffusion of metals at the interface of the substrate and the nickel cladding. The conditions most suitable for this operation are a temperature of about 800° to about 1000°C., a treatment time of about 10 to 40 minutes and a reducing atmosphere, e.g. a hydrogen atmosphere. Under microscopic examination, the annealed pieces are observed to have between the nickel cladding and the substrate a layer of interdiffused nickel and iron of finite thickness, typically 0.01 mm. The nickel cladding is thus metallurgically bonded to the substrate throughout the interface between the cladding and the substrate. The plated and annealed blank may be imprinted between minting dies with deep and clear impressions without excessive die wear and the imprinted nickel layer exhibits excellent wear and corrosion resistance.

The magnetism which can be induced by an applied field of 150 oersteds in the annealed blank should be less than about 4,000 gauss measured on an axis through the centre of and perpendicular to the faces of the blank. The induced magnetism of a blank under an applied field of 150 oersteds can conveniently be measured by known procedures using a Walker model MH-1 Hysteresisgraph. In most cases, provided the nickel layer on the faces of the blank is at least 0.05 mm, the blanks, and the coins minted therefrom, will have the desired magnetic properties. However, should the induced magnetism B of a particular plated and annealed blank which meets the minimum plating thickness requirements be in excess of about 4000 gauss, (measured on the axis through the centre of and normal to the face of the blank in a field of 150 oersteds), the value of "B" can be decreased by increasing the thickness of the layer of nickel plated onto the blank.

The magnetism should be below the above-noted level to ensure that the blanks, after minting, are accepted by most existing coin-discriminating devices using magnetic tests. In such devices, as previously indicated, the magnitude of the force of attraction developed between an inserted coin and a permanent magnet determines whether the inserted coin will be accepted or rejected by the devices. Quite surprisingly, it is found that most coin-discriminating devices using magnetic tests cannot distinguish between coins minted from the blanks of the invention and like-shaped solid nickel coins despite significant differences in the construction of the devices. Some devices, for example, determine the force of attraction between a permanent magnet and a coin in its radial direction while others determine the attraction between a magnet and a coin along its cylindrical axis. The magnetic induction of the permanent magnets among the different devices vary considerably as do the gap lengths between the magnets and the coins in their passage through the devices. Despite these differences, coins minted from the blanks of the subject invention are accepted by most coin-discriminating devices which accept pure nickel coins of the same size, shape and weight.

Following annealing, the blanks must be burnished prior to minting to give their surfaces a uniform finish suitable for minting. Minting will usually consist of pressing the blanks simultaneously between obverse and reverse dies to form a complete design including a milled edge or reeding, if desired.

EXAMPLE 1

This example describes a procedure for producing blanks according to the subject invention. 42.3 gms of coin-shaped steel pieces having a carbon content of 0.01 wt. % and having a mean piece weight of 4.23 gms were placed in a perforated polypropylene horizontal plating barrel 30.5 cm long and 15.25 cm in diameter. After loading, the barrel and contents were subjected to the following sequence of cleaning steps: a 15 minute soak in a hot detergent; a 2 minute rinse in hot water; a 2 minute rinse in cold water; another 2 minute rinse in cold water; a 4 minute soak in 10% HCl; and a 2 minute rinse in cold water.

The barrel and contents were then placed in a plating tank provided with approximately 150 liters of a nickel sulphamate electrolyte containing 79.1 g/l nickel, 1.34 g/l chloride ions and 24.5 g/l borate ions. The solution had a pH of 4.0 and was maintained at a temperature of 49°C. Four anode baskets were immersed in the plating tank, each basket being formed of titanium mesh and containing approximately 9000 grams of nickel anodes. The potential difference between the anode and cathode was 6.0 volts and the current flowing therebetween was 30 amps. D.C.

The barrel was rotated at 6 rpm for 18.6 hours and was then removed from the tank and was subjected to a cold rinse for two minutes and a hot rinse for two minutes. The contents of the barrel were then discharged and dried in hot air.

The dimensions of a representative blank before and after plating are given in the following table:

TABLE 1

| Dimension of Steel substrate (mm) | | Thickness of nickel layer (mm) | | Amount of Nickel Deposited (as wt % of total wt. of substrate and nickel cladding) |
| --- | --- | --- | --- | --- |
| diameter | thickness | on faces | on edges | |
| 23.454 | 1.249 | 0.072 | 0.278 | 20.9 |

The results show that the nickel layer deposited on the edges of the steel pieces is slightly less than 4 times thicker than that deposited on the faces.

The blanks were next annealed at 990°C. for 17 minutes in a hydrogen atmosphere. The induced magnetism value B of a typical annealed blank in an applied field of 150 oersteds was measured on an axis through the centre of and normal to the face of the blank and, for comparative purposes, the B value of one of the steel blanks before plating and annealing and of a pure nickel blank of essentially the same size and shape were determined. The results are shown in Table II.

TABLE II

| Blank | B (Gauss)* |
| --- | --- |
| Nickel plated and annealed | 3,100 |
| Mild steel | 6,000 |
| Pure nickel | 2,400 |

*In each case, values for the magnetic induction B were taken from the first quadrant for a B-H loop with a positive increasing applied field.

What we claim as new and desire to protect by Letters Patent of the United States is:

1. A coin blank comprising a core formed of low carbon steel having a carbon content below about 0.03 wt. %, a continuous cladding of nickel completely encasing said core, said cladding having a thickness of at least 0.05 mm on each of the opposed faces of the blank and a thickness, measured radially, of 2 to 4 times the face thickness at the edge thereof, a layer of interdiffused nickel and iron metallurgically bonding said cladding to said core, said blank having a hardness value of less than 65 on the Rockwell 30T hardness scale and said blank having an induced magnetism value B in a field of 150 oersteds of less than about 4000 gauss measured on an axis through the centre of and normal to the faces of the blank whereby said blank, after minting, possesses magnetic properties substantially similar to a pure nickel coin of similar size and shape.

2. The blank as claimed in claim 1 wherein said mild steel core contains less than 0.01% by weight carbon.

3. The blank as claimed in claim 1 wherein the hardness value is less than about 45 on the Rockwell 30T hardness scale.

* * * * *

UNITED STATES PATENT AND TRADEMARK OFFICE
CERTIFICATE OF CORRECTION

PATENT NO. : 3,940,254
DATED : February 24, 1976
INVENTOR(S) : Arthur G. McMullen et al It is certified that error appears in the above-identified patent and that said Letters Patent are hereby corrected as shown below:

Column 4, line 68, change "induction" to "inductions"

Column 5, line 7, change "the same" to "similar"

Column 5, line 19, change "42.3" to "2642.3"

Column 5, line 21, change "4.23" to "4.33"

Signed and Sealed this

Seventh Day of September 1976

[SEAL]

Attest:

RUTH C. MASON
Attesting Officer

C. MARSHALL DANN
Commissioner of Patents and Trademarks